Jan. 9, 1968  P. S. HACKER  3,363,252
CROSS-POLARIZATION SUPPRESSION FOR ANTENNA
FEED BY USE OF EXTERNAL VANE
Filed Nov. 23, 1964
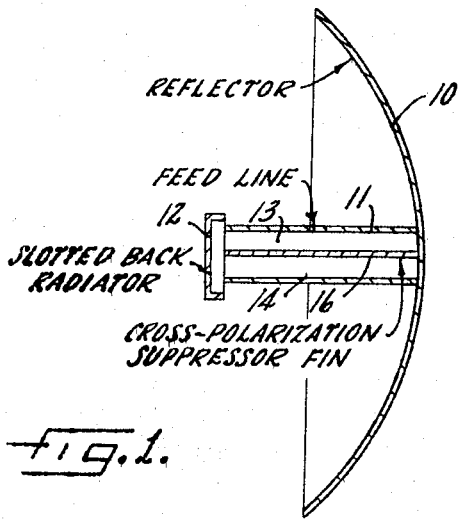
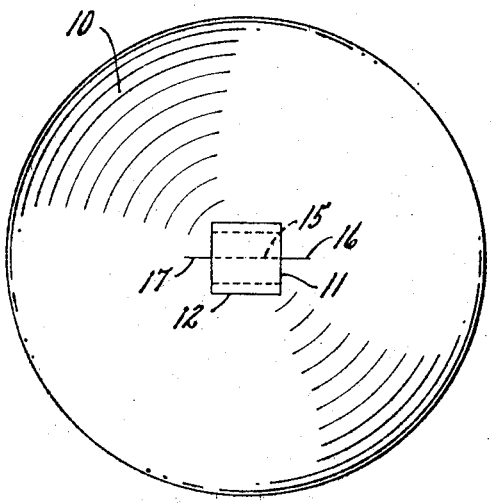
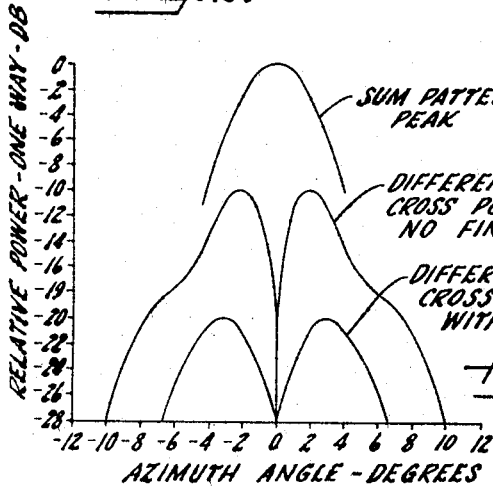
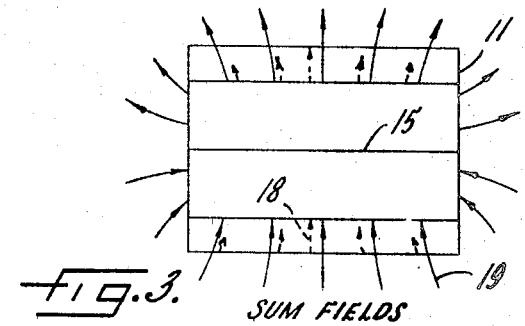
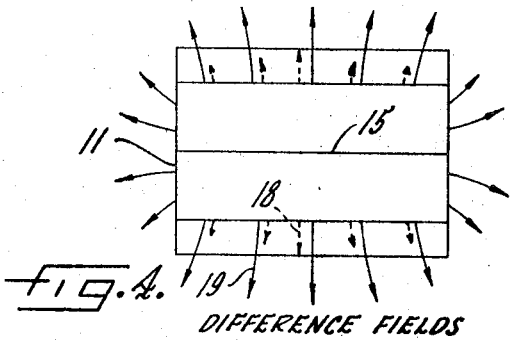
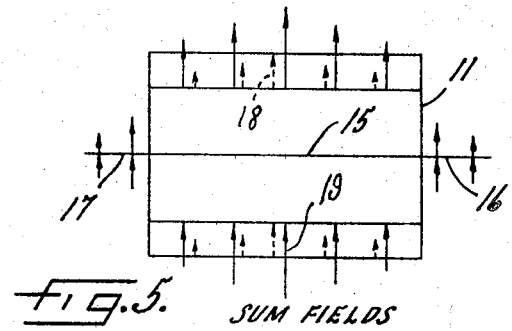
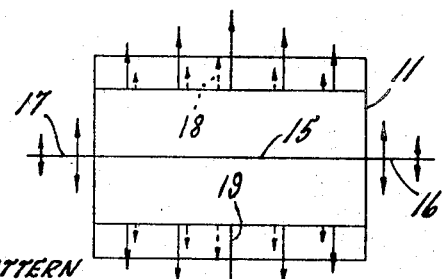
INVENTOR.
Philip S. Hacker,
BY
H. H. Loscke
Att'ys.

United States Patent Office

3,363,252
Patented Jan. 9, 1968

3,363,252
CROSS-POLARIZATION SUPPRESSION FOR ANTENNA FEED BY USE OF EXTERNAL VANE
Philip S. Hacker, Silver Spring, Md., assignor, by mesne assignments, to the United States of America as represented by the Secretary of the Navy
Filed Nov. 23, 1964, Ser. No. 413,384
5 Claims. (Cl. 343—756)

This invention relates to cross-polarization suppression for radar antennas and more particularly to the suppression of cross-polarization for a monopulse type radar antenna used for terrain follow capabilities.

In recent years, a monopulse technique has been developed for performing terrain follow with tactical aircraft. This technique measures the range to the null point in a vertical monopulse antenna pattern. The height of the terrain at this point can then be computed through a simple geometrical calculation. Good performance from such a system depends upon a well defined null in the vertical boresight direction from the monopulse difference channel output. If conventional airborne monopulse antenna designs are used, this null plane is not of adequate quality.

If the directly polarized pattern is examined in detail, the null performance is generally everything it should be, so that in many cases these antennas are thought to be adequate. However, if the cross-polarized difference pattren is examined, high energy return is noted along the elevation boresight plane to the left and right of the azimuth boresight plane. This effect is particularly serious in the air-to-ground situation, since the ground almost completely depolarizes the incident signal which is, in most cases, quite pure, direct polarization There are two causes for cross-polarization in an antenna which has a feed design for a single sense of linear polarization. The first, is due to the dipole-like quality of many antenna feeds. The cross-polarization effect is due to the curvature of the electric field in the principal planes of the aperture, the horizontal and vertical planes which are in line and crossed to the electric field. For a true dipole these electric fields look similar to the longitude and meridian lines of a world globe. The more a feed can be designed to act as a plane wave source, the less is this effect. The second of the two causes of cross-polarization for monopulse difference channel operation is by the presence of the antenna feed. The antenna feed for monopulse radar systems consists of a pair of adjacent waveguides or a dual waveguide attached diametrically from the antenna reflector which terminates at the focal point of a reflector in a slotted back radiator which is a metallic plate forming upper and lower slots with the ends of the dual waveguide antenna feed. This slotted radiator "sees" the reflector and the outside of the antenna feed. Since cross-polarization is due to the electric field curves in the principal planes of the antenna aperture, this cross-polarization is seen by the slotted back radiator. This cross-polarization is, of course, very detrimental to the difference signal produced in the radar to obtain the proper magnitude of the angular error; however, the sum signal is not affected by this cross-polarization. It is the fundamental requirement that the boundary condition of the waveguide feedline or feedhorn for the electric field is perpendicular to its metal outer surface to avoid this cross-polarization.

In the present invention a fin or vane is affixed along each side of the antenna feedline or feedhorn in the longitudinal direction and in the plane of the wall of the feedline or feedhorn which divides it into its two microwave channels. These fins or vanes will cause a cancellation of most of the electric cross-polarizing vectors to maintain these electric vectors oriented parallel to the sides of the feedline or feedhorn and perpendicular to the fins or vanes. Since the slotted back radiator will "see" only electric vectors in a parallel relation, such as in the vertical plane for ground follow, cross-polarization will be minimized in the difference channel upon reception of the radar echoes. It is therefore a general object of this invention to provide a monopulse radar antenna with cross-polarization suppressor fins mounted on the external sides of the antenna feedline or feedhorn and in the same plane as the waveguide partition dividing it into a dual feed to cause electric vectors therearound to be oriented in parallel planes.

These and other objects and the attendant advantages, features, and uses will become more apparent to those skilled in the art as the description proceeds when considered along with the accompanying drawing, in which:

FIGURE 1 illustrates, in a schematic cross-sectional form, a monopulse radar antenna showing the dual or pair of waveguides terminating in a back radiator toward the reflector;

FIGURE 2 illustrates a face view of FIGURE 1;

FIGURE 3 illustrates, in diagrammatic form, a cross-sectional view of the feedhorn looking in the direction of the slotted back radiator and illustrating the sum electric field signals in the absence of the suppressor fins;

FIGURE 4 illustrates the feedline of FIGURE 3 with the difference electric field signals in the absence of the suppressor fins;

FIGURE 5 illustrates the feedline of FIGURES 3 and 4 with the suppressor fins attached thereto and the electric fields for the sum signal return;

FIGURE 6 illustrates the feedline of FIGURE 5 showing the difference electric fields therearound; and FIGURE 7 is a graph of the sum and difference patterns, showing the difference and sum patterns produced without the suppressor fins and another difference pattern produced with the suppressor fins.

Referring more particularly to FIGURES 1 and 2, there is illustrated in diagrammatic form the parabolic reflector 10 of an antenna having a feedline 11 supported and projected diametrically from the center of the reflector outwardly to a point terminating in a slotted back radiator 12 at the focal point of the reflector 10. The feedline 11 is divided into two microwave guidelines 13 and 14 by a division wall 15 to produce monopulse transmissions and reception. As viewed in FIGURES 1 and 2, the monopulse radar antenna is oriented for elevational lobing which may be used for a terrain follow type of radar. As more particularly seen in FIGURE 2, fins or vanes 16 and 17 are affixed normally to the opposite external sides of the feedline or feedhorn 11 and longitudinally thereof in the plane of the division wall 15 within the feedline. These vanes or fins 16 and 17 are of an electrical conductive material of a nature to suppress cross-polarization of the electric field attempting to rotate about the feedline or feedhorn 11, as will soon become clear.

Referring more particularly to FIGURES 3 and 4, the same feedline or feedhorn 11 is shown in both of these figures without the vanes or fins 16 and 17 to illustrate the electric vectors produced about the external surface of a conventional feedline. The dotted lines 18 show the electric fields at the slotted back radiator and the solid lines 19 show the electric fields near the outside of the feedline, in both figures. FIGURE 3 shows these electric fields for the sum return illustrating that the cross-polarized components of the field cancel in the principal planes for sum channel operation. FIGURE 4, on the other hand, shows the electric fields for the difference return illustrating that there is no such cancellation except at azimuth zero, assuming for the purpose of example, that the FIGURE 4 antenna is used for vertical or elevational operation.

Referring more particularly to FIGURES 5 and 6 wherein like reference characters are used for like parts in the other figures, the feedline or feedhorn 11 in these two illustrations includes the suppressor fins 16 and 17 as shown in FIGURES 1 and 2. In FIGURE 5, electric fields are all oriented in the same direction in the sum channel whereas, in FIGURE 6, the electric vectors are in opposite directions, as shown by the arrows on the vectors 18 and 19, producing electric vectors at the fins or vanes 16 and 17 which are parallel to the electric vectors at the slotted back radiator and on the external surface of the feedline 11. The fins 16 and 17, therefore, maintain the electric vectors externally of the feedhorn 11 in vertical planes, which the slotted back radiator 12 "sees," suppressing substantially all of the cross-polarization produced by these electric vectors in FIGURES 3 and 4 although much of the cross-polarization produced by the sum electric field is cancelled by this sum electric field. The electrically conductive fins 16 and 17 cause the cancellation of all electric vector components parallel therewith but are ineffective to cause any cancellation of electric vectors normal therewith, as well understood in the radar art of microwave energy. Accordingly, all electric vectors generated externally of the feedhorn or feedline 11 will be maintained in vertical planes for an elevational monopulse radar antenna, as shown in FIGURES 1 and 2. Cross-polarization suppression can be increased by increasing the area of the fins or vanes 16 and 17 but are only of an area necessary to minimize this cross-polarization to a point where it becomes tolerable and practical in the difference channels of the radar.

Referring more particularly to FIGURE 7, there is a graph illustrating the sum and difference patterns of the relative power in decibels with respect to the azimuth angle in degrees. The sum pattern only shows the top of the amplitude curve as being at zero decibels and extending one way in a negative direction while the two difference patterns are completed to the −28 decibel line of the graph. The upper difference pattern is approximately 10 decibels less than the sum pattern for an antenna having no suppression fins or vanes while the lower pattern illustrates the cross-polarization difference pattern when suppression fins or vanes are used in accordance with this invention. The magnitudes of the resulting difference channel "sidelobes" in the elevation boresight plane is only 10 decibels down from the peak of the directly polarized sum channel where no vanes are used while these detrimental sidelobes have been suppressed by an additional 10 to 12 decibels down from the peak of the directly polarized sum channel when the fins or vanes 16 and 17 are used. Since it is desirable to reduce the cross-polarization sidelobes in the difference channel as far down from the directly polarized sum channel peak as possible, it is an advantage to include vanes 16 and 17 on the feedline or feedhorn of the monopulse radar antenna to improve the radar in extracting the magnitude of the angle error of targets or ground targets in an area for all positions of the antenna lobes.

While many modifications and changes may be made in the constructional details and features of this invention within the spirit of the teaching herein, to provide a radar for specific applications herein mentioned, it is to be understood that I desire to be limited in the scope of my invention only by the scope of the accompanying claims.

I claim:
1. A cross-polarization suppressed radar antenna comprising:
   a radar antenna having a reflector and a duel feed conductor supported outwardly to the reflector focal point terminating in a back radiator; and
   cross polarization suppression vanes extending longitudinally of said dual feed on opposite sides thereof in the same plane as the division line of said dual feed.

2. A cross-polarization suppressed radar antenna comprising:
   a radar antenna having a reflector and a dual conductor feed supported outwardly of the reflector to the reflector focal point terminating in a back radiator to transmit and receive microwave energy by reflections off of said back radiator and said reflector establishing electric vectors along said dual conductor feed; and
   cross polarization suppression vanes extending longitudinally of said dual conductor feed in the plane of the division line of said dual conductor feed to cause said electric vectors to maintain orientation normal to said vanes thereby suppressing cross polarization.

3. A cross-polarization suppressed radar antenna comprising:
   a monopulse radar antenna having a reflector and a dual conductor feedhorn supported diametrically of the reflector to the reflector focal point terminating in a back radiator to transmit sum signals and receive sum and difference signals by reflecting off of said back radiator and said reflector establishing electric vectors along said dual conductor feedhorn; and
   cross polarization suppressor vanes extending longitudinally along the exterior of said dual conductor feedhorn in the plane of the division of the conductors therein to cause said electric vectors to maintain orientation perpendicular to said vanes whereby cross polarization of said electric vectors is suppressed.

4. A cross-polarization suppressed radar antenna comprising:
   a monopulse radar antenna having a reflector with a feedhorn supported diametrically thereon terminating at the reflector focal point in a slotted back radiator, said feedhorn having a longitudinal internal wall dividing same into two microwave conductors to transmit sum signals and receive sum and difference signals by reflecting off of said back radiator and reflector establishing electric vectors along said feedhorn; and
   a cross polarization suppressor vane extending longitudinally along each exterior side of said feedhorn in the plane of said internal wall to cause said electric vectors to maintain orientation perpendicular to said vanes whereby cross polarization of said electric vectors externally of said feedhorn in the paths between said back radiator and said reflector is suppressed and minimized.

5. A cross polarization suppressor as set forth in claim 4 wherein:
   said vanes are electrically conductive metallic vanes fixed integral with said feedhorn.

References Cited
UNITED STATES PATENTS 2,931,033    3/1960    Miller _____ 343—703
3,026,513    3/1962    Kurtz _____ 343—779 X HERMAN KARL SAALBACH, *Primary Examiner.*

ELI LIEBERMANN, *Examiner.*

W. H. PUNTER, *Assistant Examiner.*